Oct. 1, 1929.  H. M. CHANCE  1,730,189
APPARATUS FOR SEPARATING MATERIALS OF DIFFERENT SPECIFIC GRAVITIES
Original Filed Dec. 5, 1925
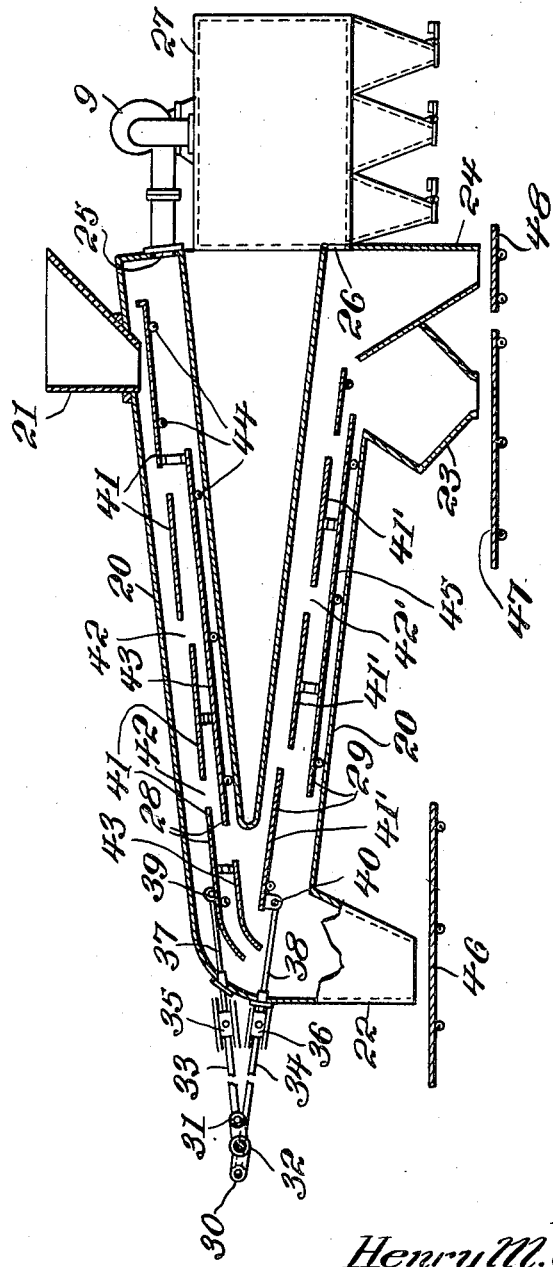
Inventor
Henry M. Chance
BY
Spear, Middleton, Donaldson + Hall.
ATTORNEYS Patented Oct. 1, 1929

1,730,189

UNITED STATES PATENT OFFICE

HENRY MARTYN CHANCE, OF PHILADELPHIA, PENNSYLVANIA

APPARATUS FOR SEPARATING MATERIALS OF DIFFERENT SPECIFIC GRAVITIES

Original application filed December 5, 1925, Serial No. 73,420. Divided and this application filed April 15, 1929. Serial No. 355,251.

My invention consists of a pneumatic apparatus for separating materials of different physical characters, being applicable to the concentration of ores, separation of coal from refuse, and the like. In carrying out my method the materials to be separated are subjected to agitation whereby the materials tend to stratify according to their relative weights and specific gravities and simultaneously are caused to move over the surface upon which they rest at any desired predetermined velocity, the upper layers being subjected to a blast of air, or other gaseous medium, moving at high velocity over the upper surface of the materials, whereby particles comprising the said upper stratum are caused to roll, slide or move over the subjacent layers. The surface over which said lower layers are moving may be provided with openings through which the slow moving particles in contact with said surface can readily drop, but across which the particles of the upper layers, moving at much higher velocity, readily pass to continue their travel upon a similar surface, or to be directly discharged as one of the separated products.

The surface over which the materials are moved may be the surface of a table, either with or without riffles, the floor of a trough or the like; the materials may be agitated by imparting a shaking or bumping movement to the said surface, and/or by causing air to flow upwardly through said materials or other convenient means for effecting agitation. By inclining the surface, or by shaking or bumping, the materials may readily be caused to move at the desired rate of travel and in the desired direction. If agitation be effected by air the floor of the trough or surface of the table will be perforate and supplied with air under pressure to provide upwardly rising air as in air-jigs, air concentrating tables and the like. If the method be carried out in a trough openings of adjustable width may be provided at intervals, and a second or carrier trough attached below the separating trough, into which materials falling through said openings will drop and along which they are transported in like manner to those in the upper trough. To complete such apparatus this double trough structure is provided with means for producing a shaking or bumping movement and is enclosed in a box or envelope through which a strong blast of air is passed by suction and/or pressure induced by a fan, or other suitable appliance for imparting motion to air.

From the foregoing description it will be understood that the method consists in translating or in assisting in translating the lighter materials, by flowing with a current of air at a relatively high velocity, towards a region of discharge for said lighter materials, and inseparately translating the heavier materials toward a region of discharge for said heavier materials, thus effecting separation by translating said materials to different regions of discharge, the lighter materials being blown out of, or away from, the heavier materials by a current of air that translates or assists in translating said lighter material to the desired region of discharge.

Apparatus by which my invention may be carried out is shown by the drawing in which the figure shows a vertical cross-section and elevation of a stationary box or envelop in which are mounted separating shaking surfaces, with the air operating current in closed circuit, with dust settling chamber, and provision for retreating.

The apparatus is completely enclosed by the stationary enveloping structure 20, provided with a feed hopper 21, a bin for lighter materials, 22, a bin for heavier materials 23, and a bin 24 for mixed materials and/or materials of intermediate weight, such as boney or laminated coal, when treating coal, or slate with intermixed coal, or middlings when treating ores. By keeping these bins and hopper 21 partly filled, the structure is air sealed. Provision for the circulation of air by means of a blower, shown as a fan 9, is provided by the aperture 25 connected to the discharge from the fan 9, and the opening 26 communicating with the dust collecting chamber 27, with which the intake of the fan 9 is connected.

Within this structure there are installed two shaking elements 28 and 29 to which motion is imparted by the cranks 30 and 31 both operated by the drive shaft 32 by means of connecting rods 33, 34, crossheads 35, 36, and rods 37, 38, which are attached to the shaking elements 28, 29, through stuffing boxes 39, 40.

The shaking element 28 consists of a single structure the parts of which are rigidly connected together and include a number of plates or transporting surfaces 41, 41, constituting the floor of a trough or other suitable pan separated by open gaps or apertures 42, and a similar transporting pan floor 43, 43, below 41, 41 for the transportation and retreatment of materials dropping through the apertures 42, 42. This structure 28 is mounted by any means that will permit of free reciprocating movement, illustrated in the drawing by the rollers 44, 44.

The second shaking element 29 is of similar construction to element 28 consisting of similar surfaces 41', 41', with air gaps and conveying pan 45.

Describing the operation of this apparatus in removing slate and boney coal from coal, the coal is fed upon the shaking floor 41, is stratified by the shaking motion with the coal working up to the top of the mass, the whole mass moving down over the floor 41 at any desired rate of travel depending upon the amplitude of the oscillations and the inclination of the surface, the coal is rapidly blown away from the moving mass and falls into the hopper 22, while the slate and boney coal drop through the gaps 42 upon the shaking surface 43, together with coal that may be entrained with the slate and boney coal. As this mixture moves down over the surface 43, coal rising to its upper portion is blown rapidly away from the moving mass and falls into hopper 22, while the slate and boney coal drop through the aperture in 43 and falls upon the shaking surface 41', down and along which it is transported, the slate falling through the apertures 42' into the conveying pan 45 to be discharged into hopper 23, while the boney coal is blown by the air current across the apertures 42' and is delivered into middlings hopper 24, for crushing or other retreatment. Means for removing the separated materials from hoppers 22, 23, and 24 are diagrammatically illustrated by 46, 47, and 48 shown as belt conveyors.

The use of the apparatus in the concentration of ores or the separation of other materials will be understood without further description.

Agitation by shaking of dry materials does not produce complete stratification according to the specific gravities of the individual particles. Depending upon the character of the agitation there will be a tendency for the heavier and larger particles to sink and the lighter and smaller particles to accumulate at the top, or, a tendency of the coarser particles to rise to and rest at or upon the surface of the finer particles, the top layer often containing coarse particles of both high and low specific gravities. This is utilized in dry panning gold gravel, by bringing the coarse gravel to the top, skimming off the coarse pebbles and repeating until nothing but sand and fine particles of gold mixed with magnetic sand, and other heavy minerals, remain in the pan.

In the apparatus herein disclosed in its application to coal, advantage is taken of this tendency of the large particles of coal and slate also to accumulate at the top or ride upon the top of the shaking mass, the air current being adjusted as to velocity to blow and transport the coal at high velocity without moving the heavier slate and other impurities, or if such movement occurs, at much greater velocity than slate or rock can be moved by this air current.

This application is a division of my application Ser. No. 73,420, filed December 5, 1925, for method and apparatus for separating materials of different specific gravities.

I claim:

1. Apparatus for separating materials of different specific gravities and different physical character, comprising in combination a plurality of material separating trays arranged in series and in steps with an open vertical passage or gap separating the successive trays, means for imparting longitudinal reciprocating motion to said trays adapted to translate said materials along said trays, said vertical passage or gap being adapted to permit materials flowing at low velocity over the floor of one tray to drop through said passage or gap between said trays, while permitting materials moving at relatively high velocity to cross said gap without dropping therethrough and fall upon the floor of the next succeeding tray, said trays being adapted to restrain the motion of materials in one direction while permitting unobstructed flow in the opposite direction; means adjacent to the first of said trays for feeding materials into said tray; a casing enclosing said trays having top, sides and floor, said top being relatively close to and substantially parallel to the series of trays; means for inducing a motion of relatively high velocity to a gaseous fluid medium across the gaps and along the surfaces of the trays and of the material in the trays; means for delivering from said trays and said casing materials translated by said gaseous fluid medium, and means for delivering from said trays and said casing materials translated by the reciprocating motion of said trays, said first-mentioned delivering means being beyond the other in the path of travel.

2. In apparatus according to claim 1, an unbroken lower tray mounted beneath said spaced trays and connected to said upper spaced trays to move as a unit therewith, said lower tray extending and disposed beneath said spaces to receive the material which drops therethrough and forming a secondary agitating and separating surface over which the fluid medium is passed at high velocity to further separate the material.

3. In apparatus according to claim 1 said casing extending downwardly on an incline in one direction and then extending downwardly on an incline in the opposite direction, each of said upper and lower inclined portions being provided with a double reciprocating trough comprising the said series of upper spaced trays rigidly connected together and an unbroken lower tray beneath said spaced trays and rigidly connected thereto to move as a unit therewith, said unbroken tray extending beneath said spaces to receive the material which drops therethrough and forming a secondary agitating and separating surface over which the fluid medium is passed at high velocity to further separate the material, said means for reciprocating the trays being connected to each of said double troughs comprising the trays.

4. In combination in apparatus for separating materials of different specific gravities and different physical character, a closed tubular casing inclined downwardly in one direction and then reversing and inclining downwardly in the opposite direction, a double trough movably mounted in the upper inclined portion of said casing and a double trough movably mounted in the lower inclined portion of said casing, means for reciprocating said troughs in said casing, said troughs each comprising upper and lower trays, the upper trays comprising a series of longitudinally spaced trays, and the lower trays extending beneath said upper trays and extending uninterruptedly beneath the spaces between them, there being a feed inlet opening for the materials at the upper end of said casing, means at the upper end of the casing for causing a gaseous fluid medium to pass through said casing at high velocity over the upper surface of said material on said trays, and separate receiving means for said materials separated by agitation and by the blast of air over the surface of the materials on the trays.

5. Apparatus according to claim 4 in which are provided receiving means adjacent the apex of said inclined portions of the closed casing for receiving the lighter and coarser material blown from said upper and lower trays of said upper trough, and receiving means at the lower end of the casing for receiving the heavier materials and separate means for receiving materials of intermediate weight, the lower tray of said upper trough having an opening therethrough disposed directly above the first upper spaced tray of the lower trough through which opening the heavier material from the upper trough drops onto the said first upper tray of the lower trough for further treatment.

In testimony whereof, I affix my signature.

HENRY MARTYN CHANCE.